United States Patent
Cho et al.

(10) Patent No.: US 10,673,843 B2
(45) Date of Patent: Jun. 2, 2020

(54) SYSTEM AND METHOD FOR AUTHENTICATION SERVICE

(71) Applicant: SAMSUNG SDS CO., LTD., Seoul (KR)

(72) Inventors: Jae-Hyuk Cho, Seoul (KR); Hee-Sung Yang, Seoul (KR); Hyun-Bea Shin, Seoul (KR); Hyun-chul Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 206 days.

(21) Appl. No.: 15/991,621

(22) Filed: May 29, 2018

(65) Prior Publication Data

US 2018/0351944 A1 Dec. 6, 2018

(30) Foreign Application Priority Data

May 30, 2017 (KR) .................. 10-2017-0066688

(51) Int. Cl.
*H04L 29/06* (2006.01)
*H04L 9/32* (2006.01)

(52) U.S. Cl.
CPC ........ *H04L 63/0838* (2013.01); *H04L 9/3213* (2013.01); *H04L 9/3228* (2013.01); *H04L 9/3271* (2013.01); *H04L 2463/082* (2013.01)

(58) Field of Classification Search
CPC . H04L 63/0838; H04L 63/1408; H04L 63/08; H04L 9/3213; H04L 9/3228; H04L 9/3271; H04L 2463/082; H04W 12/06; H04W 12/08
See application file for complete search history.

(56) References Cited

U.S. PATENT DOCUMENTS

| | | | |
|---|---|---|---|
| 2010/0199336 A1* | 8/2010 | Tan ........................ | H04L 9/3226 726/6 |
| 2014/0250518 A1* | 9/2014 | Schneider ............... | G06F 21/34 726/9 |
| 2016/0306955 A1* | 10/2016 | Martin .................... | G06F 21/34 |

* cited by examiner

*Primary Examiner* — Yogesh Paliwal
(74) *Attorney, Agent, or Firm* — Sughrue Mion, PLLC

(57) ABSTRACT

Provided is an authentication service system and authentication service method. According to embodiments of the present disclosure, when a plurality of authentication processes are performed using different authentication factors, an access token is issued based on an authentication factor used in a previous authentication process; and a subsequent authentication process is performed according to validity of the access token issued in the previous authentication process.

19 Claims, 12 Drawing Sheets

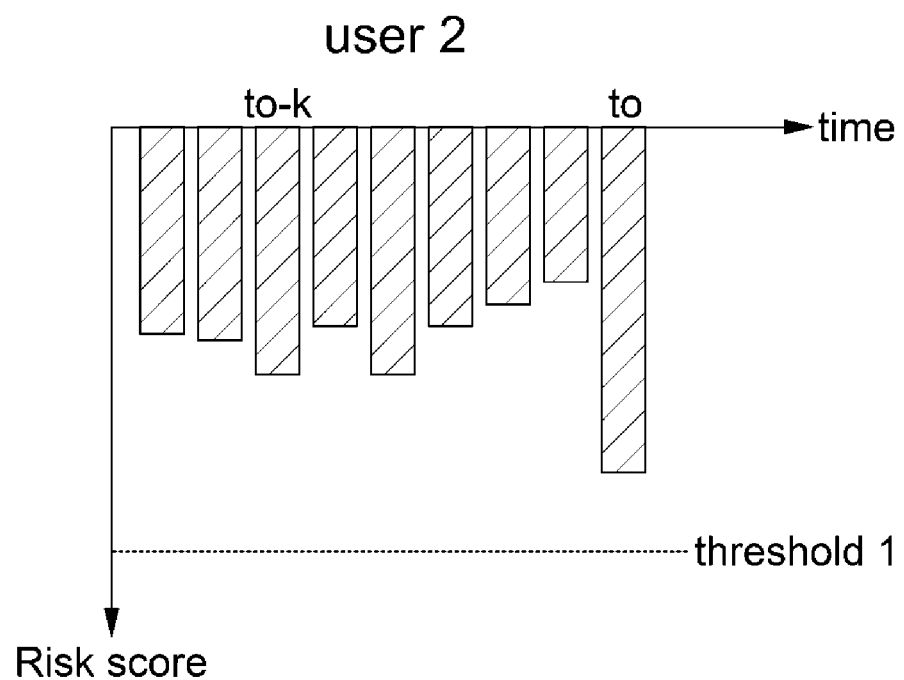

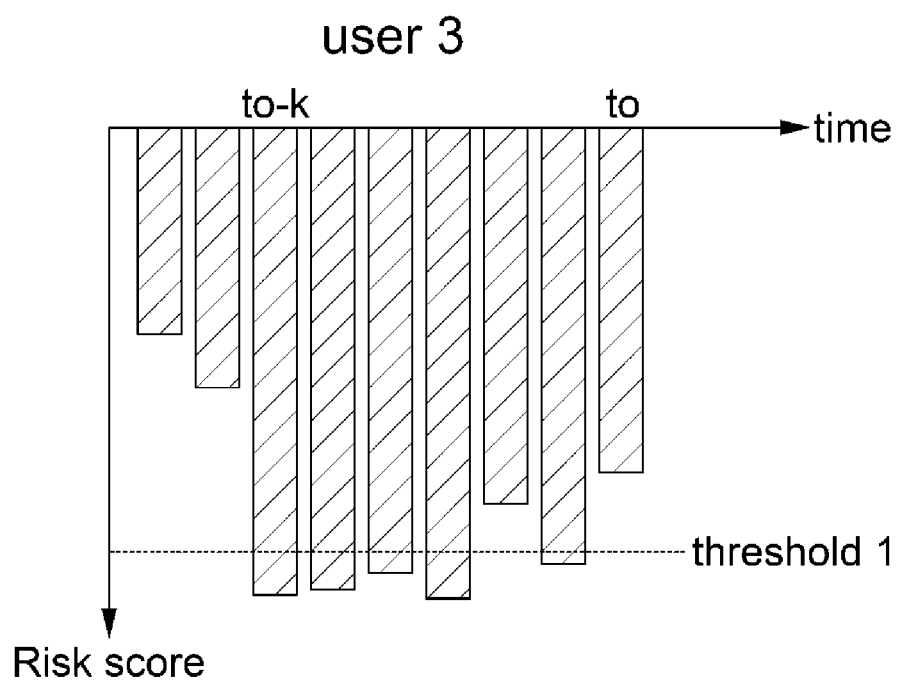

SYSTEM AND METHOD FOR
AUTHENTICATION SERVICE

CROSS-REFERENCE TO RELATED APPLICATION(S)

This application claims the benefit under 35 USC § 119(a) of Korean Patent Application No. 10-2017-0066688, filed on May 30, 2017, in the Korean Intellectual Property Office, the entire disclosure of which is incorporated herein by reference for all purposes.

BACKGROUND

1. Field

The following description relates to technology for user authentication using a plurality of authentication factors.

2. Description of the Related Art

In recent Internet environment, hacking techniques are becoming increasingly sophisticated, which makes it more difficult to effectively respond to a variety of intelligent hacking threats with single-factor authentication technologies. Generally, various authentication technologies, such as password, short message service (SMS) authentication, one-time password, and digital certificate, are used for user authentication. However, attackers are attempting to hack authentication information for monetary gain in various ways. So if only a single-factor authentication technique is applied, the risk of leakage of such information may be increased.

Recently, a multi-factor authentication technique combining two or more single-factor authentication techniques and a risk-based authentication technique have been attracting attention as methods for supplementing the single-factor authentication technique

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is an authentication service system and authentication service method.

In accordance with an aspect of the present disclosure, there is provided an authentication service method, including: relaying a first authentication process for a user of a client device by receiving, from the client device, identification information for a first authentication factor and first authentication information generated based on the first authentication factor, and transmitting, to one of a plurality of authentication servers, the first authentication information based on the identification information for the first authentication factor; generating a first access token, which includes the identification information for the first authentication factor based on the first authentication process being successful, and transmitting the generated first access token to the client device; receiving the first access token from the client device and verifying validity of the received first access token; relaying, based on the received first access token being valid, a second authentication process for the user of the client device by receiving, from the client device, identification information for a second authentication factor and second authentication information generated based on the second authentication factor, and transmitting, to one of the plurality of authentication servers, the second authentication information based on the identification information for the second authentication factor; and generating a second access token, which includes the identification information for each of the first authentication factor and the second authentication factor, and transmitting the generated second access token to the client device based on the second authentication process being successful.

Each of the first authentication factor and the second authentication factor may be one from among a knowledge-based authentication factor, a possession-based authentication factor, and a feature-based authentication factor.

The plurality of authentication servers may include at least one from among a Fast Identity Online (FIDO)-based authentication server, an OTP-based authentication server, a Short Message Service (SMS)-based authentication server, an e-mail based authentication server, a certificate-based authentication server, and an ID/password-based authentication server.

The authentication service method may further include: calculating a risk score for the first authentication process based on risk factors associated with the first authentication process and the first authentication process being successful; and (h) determining whether the second authentication process is required based on the calculated risk score, wherein transmitting the generated first access token to the client device comprises transmitting a request for performing the second authentication process to the client device based on the second authentication process being required; and wherein the receiving the first access token, the relaying the second authentication process and generating the second access token are performed based on the request for performing the second authentication process being transmitted.

The authentication service method may further include calculating, based on successful completion of the second authentication process, a risk score based on risk factors associated with the first authentication process and the second authentication process.

The authentication service method may further include determining whether a third authentication process is required based on the calculated risk score, wherein the transmitting the generated second access token and a request for performing the third authentication process to the client device are performed based on the third authentication process being required.

The authentication service method may further include: receiving the second access token from the client device, and verifying validity of the second access token; relaying, based on the received second access token being valid, the third authentication process for the user of the client device by receiving, from the client device, identification information for a third authentication factor and third authentication information generated based on the third authentication factor, and transmitting, to one of the plurality of authentication servers, the third authentication information based on the identification information for the third authentication factor; and generating a third access token, which includes the identification information for each of the first authentication factor, the second authentication factor, and the third authentication factor, and transmitting the generated third access token to the client device based on the third authentication process being successful.

Each of the first authentication factor, the second authentication factor, and the third authentication factor may be one from among a knowledge-based authentication factor, a possession-based authentication factor, and a feature-based authentication factor.

The authentication service method may further include calculating the risk score based on risk factors associated with the first authentication process, the second authentication process, and the third authentication process based on the third authentication process being successful.

In accordance with another aspect of the present disclosure, there is provided an authentication service system, including: one or more processors; a memory; and one or more programs configured to be executed by the one or more processors and stored in the memory, wherein the one or more programs may include instructions to control the authentication service system to perform: relaying a first authentication process for a user of a client device by receiving, from the client device, identification information for a first authentication factor and first authentication information generated based on the first authentication factor, and transmitting, to one of a plurality of authentication servers, the first authentication information based on the identification information for the first authentication factor; generating a first access token, which includes the identification information for the first authentication factor based on the first authentication process being successful, and transmitting the generated first access token to the client device; receiving the first access token from the client device and verifying validity of the received first access token; relaying, based on the received first access token being valid, a second authentication process for the user of the client device by receiving, from the client device, identification information for a second authentication factor and second authentication information generated based on the second authentication factor, and transmitting, to one of the plurality of authentication servers, the second authentication information based on the identification information for the second authentication factor; and generating a second access token, which includes the identification information for each of the first authentication factor and the second authentication factor, and transmitting the generated second access token to the client device based on the second authentication process being successful.

Each of the first authentication factor and the second authentication factor may be one from among a knowledge-based authentication factor, a possession-based authentication factor, and a feature-based authentication factor The plurality of authentication servers may include at least one from among a Fast Identity Online (FIDO)-based authentication server, an OTP-based authentication server, a Short Message Service (SMS)-based authentication server, an e-mail based authentication server, a certificate-based authentication server, and an ID/password-based authentication server.

The one or more programs may further include instructions to control the authentication service system to perform: calculating a risk score for the first authentication process based on risk factors associated with the first authentication process and the first authentication process being successful; and determining whether the second authentication process is required based on the calculated risk score, wherein the transmitting the generated first access token to the client device comprises transmitting a request for performing the second authentication process to the client device based on the second authentication process being required; and wherein the receiving the first access token, the relaying the second authentication process and generating the second access token are performed based on the request for performing the second authentication process being transmitted.

The one or more programs may further include instructions to control the authentication service system to perform calculating, based on successful completion of the second authentication process, a risk score based on risk factors associated with the first authentication process and the second authentication process.

The one or more programs may further include instructions to control the authentication service system to perform determining whether a third authentication process is required based on the calculated risk score, wherein the transmitting the generated second access token and a request for performing the third authentication process to the client device are performed based on the third authentication process being required.

The one or more programs may further include instructions to control the authentication service system to perform receiving the second access token from the client device, and verifying validity of the second access token; relaying, based on the received second access token being valid, the third authentication process for the user of the client device by receiving, from the client device, identification information for a third authentication factor and third authentication information generated based on the third authentication factor, and transmitting, to one of the plurality of authentication servers, the third authentication information based on the identification information for the third authentication factor; and generating a third access token, which includes the identification information for each of the first authentication factor, the second authentication factor, and the third authentication factor, and transmitting the generated third access token to the client device based on the third authentication process being successful.

Each of the first authentication factor, the second authentication factor, and the third authentication factor may be one from among a knowledge-based authentication factor, a possession-based authentication factor, and a feature-based authentication factor.

The one or more programs may further include instructions to control the authentication service system to perform calculating the risk score based on risk factors associated with the first authentication process, the second authentication process, and the third authentication process based on the third authentication process being successful.

BRIEF DESCRIPTION OF THE DRAWINGS

FIGS. 6A to 6C are diagrams illustrating examples of a risk score history.

Figure 1:
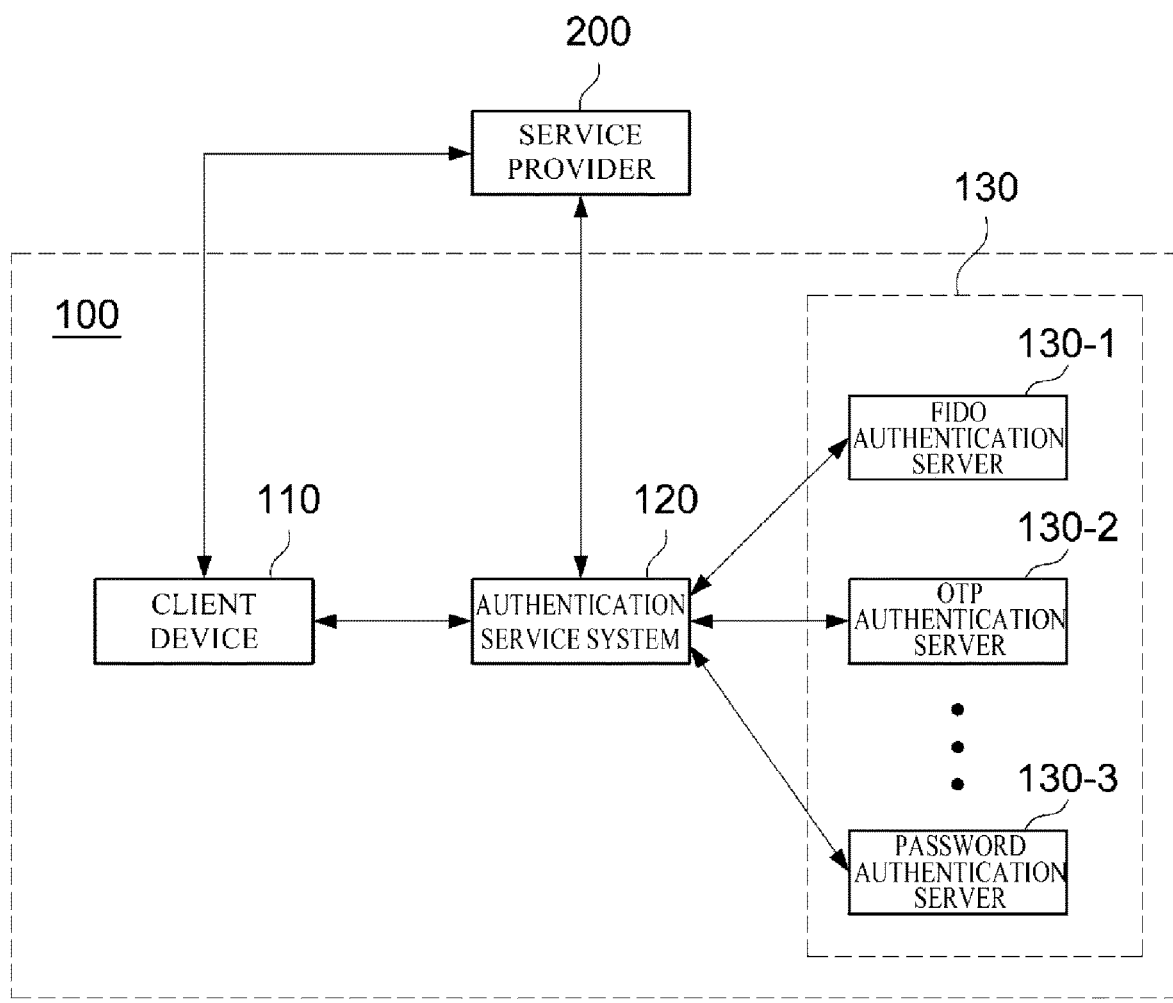
FIG. 1 is a diagram illustrating a configuration of an authentication system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present disclosure will be described in detail with reference to the accompanying drawings. The following detailed description is provided for comprehensive understanding of methods, devices, and/or systems described herein. However, the methods, devices, and/or systems are merely examples, and the present disclosure is not limited thereto.

In the following description, a detailed description of well-known functions and configurations incorporated herein will be omitted when it may obscure the subject matter of the present disclosure. Further, the terms used throughout this specification are defined in consideration of the functions of the present disclosure, and can be varied according to a purpose of a user or manager, or precedent and so on. Therefore, definitions of the terms should be made on the basis of the overall context. It should be understood that the terms used in the detailed description should be considered in a description sense only and not for purposes of limitation. Any references to singular may include plural unless expressly stated otherwise. In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

FIG. 1 is a diagram illustrating a configuration of an authentication system according to one embodiment of the present disclosure.

Referring to FIG. 1, the authentication system 100 according to an embodiment of the present disclosure performs user authentication for application services, for example, a payment service, a banking service, a securities exchange service, and the like, which are provided online by a service provider 200. The authentication system 100 includes a client device 110, an authentication service system 120 and a plurality of authentication servers 130.

Specifically, according to an embodiment of the present disclosure, the authentication system 100 may perform user authentication by performing one or more authentication processes. In this case, each of the authentication processes may be performed by using different authentication factors, and authentication methods may also vary depending on the authentication factors used in each authentication process.

More specifically, the authentication factors to be used in each authentication process for user authentication may include, for example, a knowledge-based authentication factor (e.g., ID/password, personal identity number (PIN), etc.), a possession-based authentication factor (e.g., one-time password (DTP), a smart card, a security token, etc.), a feature-based authentication factor (e.g., fingerprint, iris, voice, etc.) and the like.

In addition, each authentication process may be performed by various authentication schemes, for example, a fast identity online (FIDO)-based authentication scheme (e.g., universal authentication framework (UAF) protocol), a short message service (SMS)-based authentication scheme, an e-mail-based authentication scheme, a certificate-based authentication scheme, an OTP-based authentication scheme, an ID/password-based authentication scheme, and the like.

The client device 110 is a device possessed by a user for use an application service provided by the service provider 200 and may include various forms of devices, such as a desktop computer, a notebook computer, a tablet computer, a smart phone, a personal digital assistant (PDA), and a smart watch, which are equipped with an information processing function, a display function, a data storage function, a wired/wireless network function, and an input/output interface device (e.g., a display, a touch screen, a keyboard, a mouse, a key pad, a camera, a microphone, a speaker, or the like).

The client device 110 may perform authentication process by generating or receiving authentication information based on an authentication factor selected by a user for user authentication, and by transmitting the generated or received authentication information to one of the plurality of authentication servers 130 through the authentication service system 120. In this case, one or more authentication processes based on different authentication factors may be performed for user authentication, and authentication information transmitted in each authentication process may be different according to the authentication factor and authentication scheme selected by the user.

Figure 2:
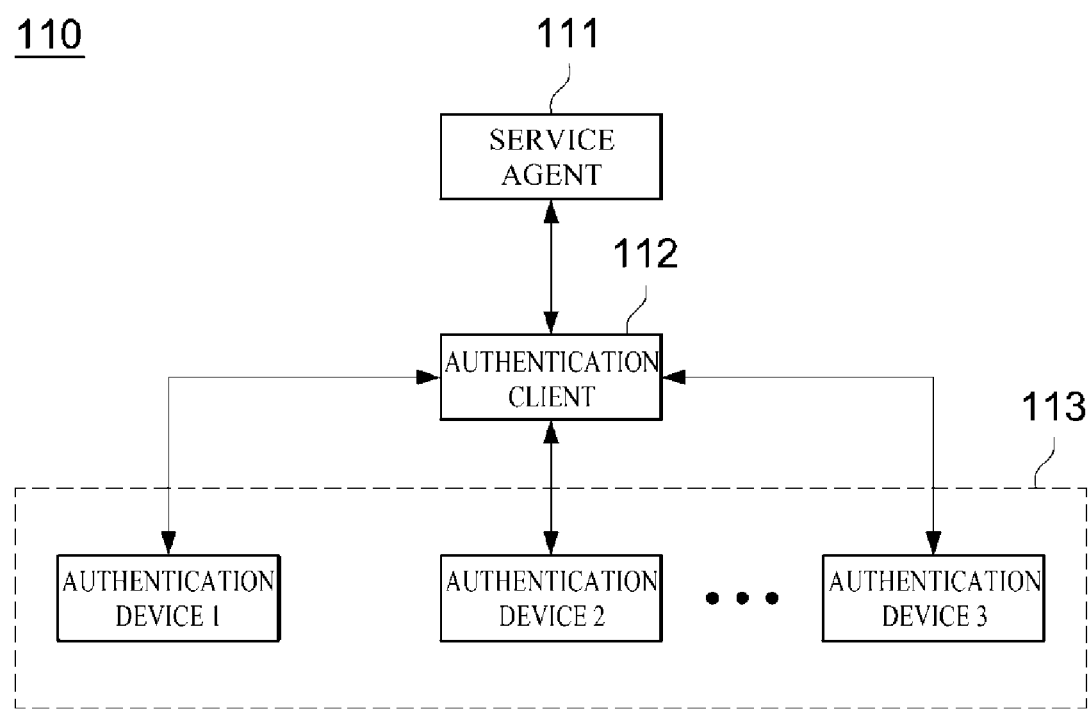
FIG. 2 is a diagram illustrating a configuration of a client device according to one embodiment of the present disclosure.

Specifically, FIG. 2 is a diagram illustrating a configuration of a client device 110 according to an embodiment of the present disclosure.

Referring to FIG. 2, the client device 110 includes a service agent 111, an authentication client 112, and one or more authentication devices 113.

The service agent 111 is a medium for providing a service of the service provider 200. For example, the service agent 111 may be a web browser operating on the client device 110 or dedicated applications provided by the service provider 200.

When there is a user authentication request from a user, the service agent 111 may provide a user interface for receiving input of information required to perform an authentication process, such as input of user identification information, selection of an authentication factor, input of authentication information (e.g., OTP, password, etc.), and the like, and request the authentication client 112 for user authentication based on the authentication factor selected by the user.

When there is a user authentication request from the service agent 111, the authentication client 112 may perform authentication process based on the authentication factor selected by the user with one of the plurality of authentication servers 130. In this case, the authentication process may be relayed through the authentication service system 120.

For example, when the authentication client 112 receives an authentication information request for authentication information to be used for user authentication based on the authentication factor selected by the user from one of the plurality of authentication servers 130 through the authentication service system 120, the authentication client 112 may request an authentication device capable of generating authentication information in accordance with the selected authentication factor among the plurality of authentication devices 113 to generate authentication information. In addition, the authentication client 112 may transmit the authentication information generated by the authentication device to the authentication server that has transmitted the authentication information request through the authentication service system 120.

Each of the plurality of authentication devices 113 generates authentication information in response to a request from the authentication client. For example, the plurality of authentication devices 113 may include a biometric authentication device which recognizes biometric information of the user, compares the recognized biometric information with biometric information registered in advance by the user to authenticate the user, and generates authentication information according to an authentication result, and an OTP generating device which generates an OTP to be sued for OTP-based authentication.

Meanwhile, each of the plurality of authentication servers 130 may perform user authentication by using authentication information received from the client device 110 through the authentication service system 120 and may include a FIDO authentication server 130-1 which performs user authentication according to a FIDO-based authentication process, an OTP authentication server 130-2 which performs user authentication according to an OTP-based authentication process, a password authentication server 130-3 which performs user authentication according to an ID/password-based authentication process, and the like. However, the authentication servers 130 are not limited to the illustrated examples, and may include various types of authentication servers capable of performing various authentication processes, such as an SMS-based authentication process, an e-mail based authentication process, a certificate-based authentication process, and the like.

The authentication service system 120 relays one or more authentication processes, performed for user authentication, between the client device 110 and one or more authentication servers among the plurality of authentication servers 130.

Specifically, in each authentication process for user authentication, the authentication service system 120 receives, from the client device 110, authentication factor identification information regarding an authentication factor selected by the user, and authentication information generated based on the selected authentication factor. In this case, the authentication factor identification information may be, for example, a name of the selected authentication factor, but in addition to the name of an authentication factor, the authentication factor identification information may also be various types of information for identifying an authentication factor by the authentication service system 120.

The authentication service system 120 may identify an authentication factor selected by the user based on the authentication factor identification information received from the client device 110, and may transmit authentication information to an authentication server, which may perform user authentication based on the identified authentication factor, among the plurality of authentication servers 130. Then, the authentication service system 120 may receive an authentication result from the authentication server, which has received the authentication information, and may transmit the received authentication result to the client device 110.

Meanwhile, Depending on authentication scheme used in each authentication process, information relayed through the authentication service system 120 may include additional information besides authentication information and authentication results. For example, in the case of an authentication process, which is performed between the client device 110 and the FIDO authentication server 130-1 according to the UAF protocol using biometric information as an authentication factor, the authentication service system 120 may receive, from the client device 110, a request for initiating authentication including the authentication factor identification information, and may forward the received request to the FIDO authentication server 130-1. Then, the authentication service system 120 may receive, from the FIDO authentication server 130-1, a request for authentication information including a challenge value, and may forward the request to the client device 110.

Meanwhile, according to an embodiment of the present disclosure, when the authentication is successful in each of the authentication processes for user authentication, the authentication service system 120 may generate an access token including identification information of each of the authentication factors used in the authentication processes performed so far and transmit the access token to the client device 110.

For example, assuming that two authentication processes based on two authentication factors are performed for user authentication, the authentication service system 120 may generate; an access token including identification information about an authentication factor used in the first authentication process and transmit the access token to the client device 110 when the first authentication process is successful.

Then, the authentication service system 120 receives the access token from the client device 110 and verifies validity; and if the access token is valid, the authentication service system 120 may relay a second authentication process. In this case, when the second authentication process is successful, the authentication service system 120 may generate an access token, which includes identification information for each of the authentication factor used in the first authentication process and the authentication factor used in the second authentication process, and may transmit the generated access token to the client device 110.

The access token may be generated based on, for example, a JavaScript Object Notation (JSON) format, and may include various types of information, such as a signature value for verifying the access token, a token expiration date, and the like, in addition to the aforementioned identification information regarding authentication factors. More specifically, the authentication service system 120 may generate and verify the access token by, for example, OAuth 2.0 authentication using an access token in form of JASON Web Token (JWT).

According to one embodiment of the present disclosure, when all the authentication processes for user authentication are successful, the authentication service system 120 may calculate a risk score based on risk factors related to each of the authentication processes and determine whether to perform an additional authentication process based on an additional authentication factor on the basis of the calculated risk score.

For example, assuming that one authentication process is performed using one authentication factor for user authentication, the authentication service system 120 may calculate a risk score based on risk factors related to the authentication process when the authentication process is successful. Then, in response to the calculated risk score exceeding a predetermined threshold value, the authentication service system 120 may request the client device 110 for additional authentication of the user.

In another example, assuming that two authentication processes using two authentication factors for user authentication are performed, the authentication service system 120 may calculate a risk score based on risk factors related to each of the authentication processes when all the authentication processes are successful. Then, in response to the calculated risk score exceeding a predetermined threshold, the authentication service system 120 may request the client device 110 for additional authentication of the user.

Meanwhile, upon transmitting the request for additional authentication of a user to the client device 110, the authentication service system 120 may receive an access token from the client device 110 and may verify validity; and if the access token is valid, the authentication service system 120 may relay an additional authentication process.

Figure 3:
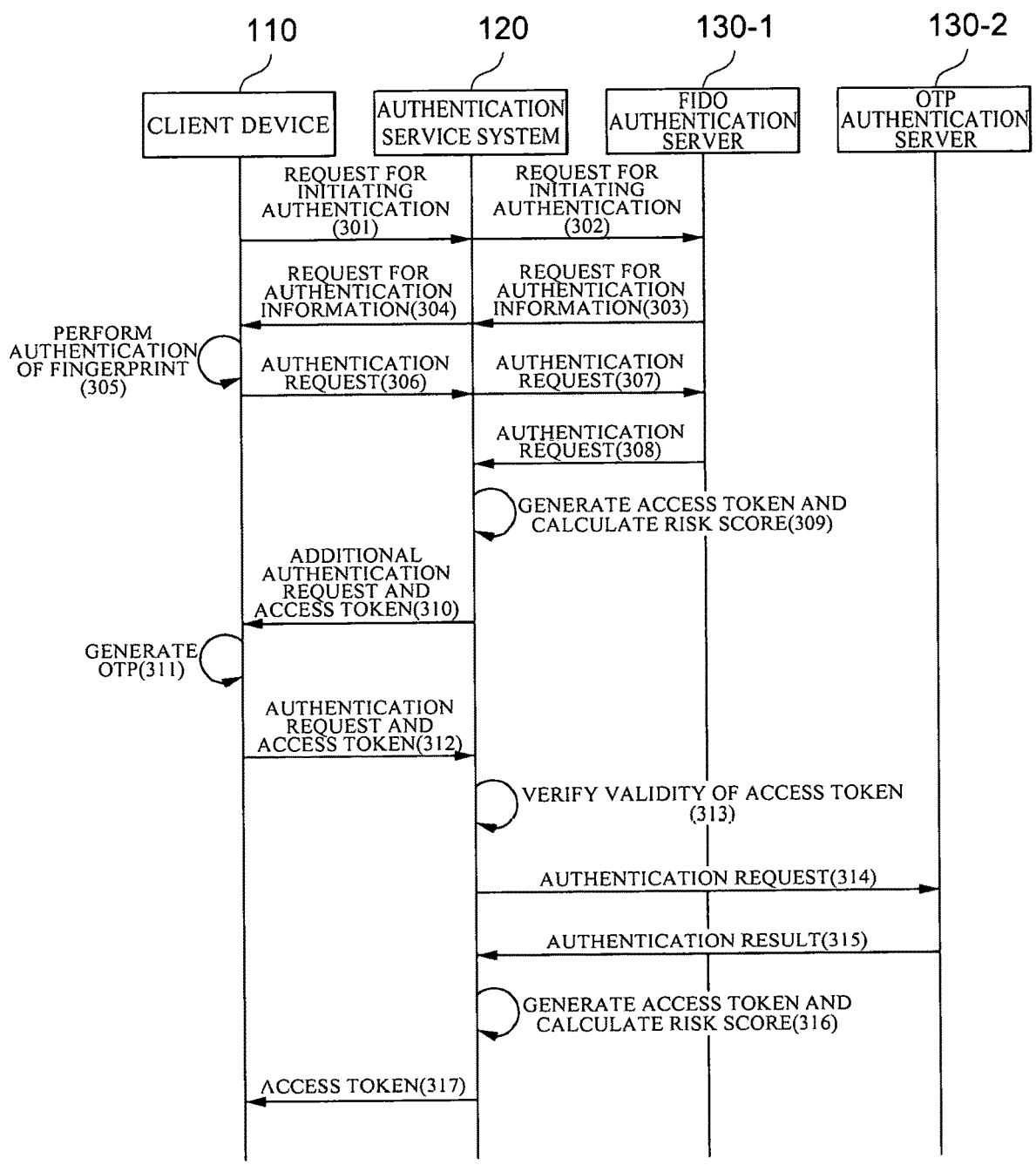
FIG. 3 is a flowchart illustrating an example of a user authentication process performed by an authentication system according to one embodiment of the present disclosure.

FIG. 3 is a flowchart illustrating an example of a user authentication process performed by the authentication system 100 according to an embodiment of the present disclosure.

Specifically, the example shown in FIG. 3 assumes that an additional authentication process is performed according to time synchronization OTP authentication scheme after an authentication process using a user's fingerprint is performed for user authentication.

Referring to FIG. 3, the client device 110 transmits, to the authentication service system 120, a request for initiating authentication, which includes authentication factor identification information indicating that the selected authentication factor is a user's fingerprint, in operation 301.

Then, the authentication service system 120 forwards the request initiating authentication to the FIDO authentication server 130-1 based on the authentication factor identification information included in the received request for initiating authentication in operation 302.

Subsequently, in response to the request for initiating authentication, the FIDO authentication server 130-1 transmits a request for authentication information to the authentication service system 120 in operation 303. In this case, the request for authentication information may include, for example, policy information and a challenge value of the FIDO authentication server 130-1.

Next, the authentication service system 120 forwards the received request for authentication information to the client device 110 in operation 304.

Then, the client device 110 authenticates the user's fingerprint and generates a signature value for the challenge value using a user's private key when the authentication of the fingerprint is successful, in operation 305.

Subsequently, the client device 110 transmits, to the authentication service system 120, an authentication request which includes the generated signature value as authentication information in operation 306.

Next, the authentication service system 120 transmits the received authentication request to the FIDO authentication server 130-1 in operation 307.

Then, the FIDO authentication server 130-1 authenticates the user by verifying the signature value using a pre-registered public key of the user and transmits an authentication result to the authentication service system 120 in operation 308.

Then, when the user authentication is successful, the authentication service system 120 generates an access token and calculates a risk score in operation 309. In this case, the access token may include authentication factor identification information indicating that a fingerprint is used as the authentication information.

Meanwhile, in response to the calculated risk score exceeding a threshold, the authentication service system 120 transmits, to the client device 110, an additional authentication request along with the generated access token in operation 310.

Subsequently, the client device 110 generates an OTP by using, for example, visual information in operation 311, and transmits an authentication request, including the generated OTP as authentication information, and the access token to the authentication service system 120 in operation 312. In this case, the authentication request may include authentication factor identification information for identifying that an OTP is selected as the authentication factor.

Then, the authentication service system 120 verifies validity of the received access token in operation 313; and if the received access token is valid, the authentication service system 120 transmits an authentication request, including the authentication information received from the client device 110, to the OTP authentication server 130-2 in operation 314.

Next, the OTP authentication server 130-2 authenticates the user by verifying the received authentication information and transmits an authentication result to the authentication service system 120 in operation 315.

Subsequently, when the authentication is successful, the authentication service system 120 generates an access token, and calculates a risk score in operation 316. In this case, the access token may include authentication factor identification information indicating that a fingerprint and an OTP are used as authentication information.

Then, the authentication service system 120 transmits the generated access token to the client device 110 in operation 317.

Figure 4:
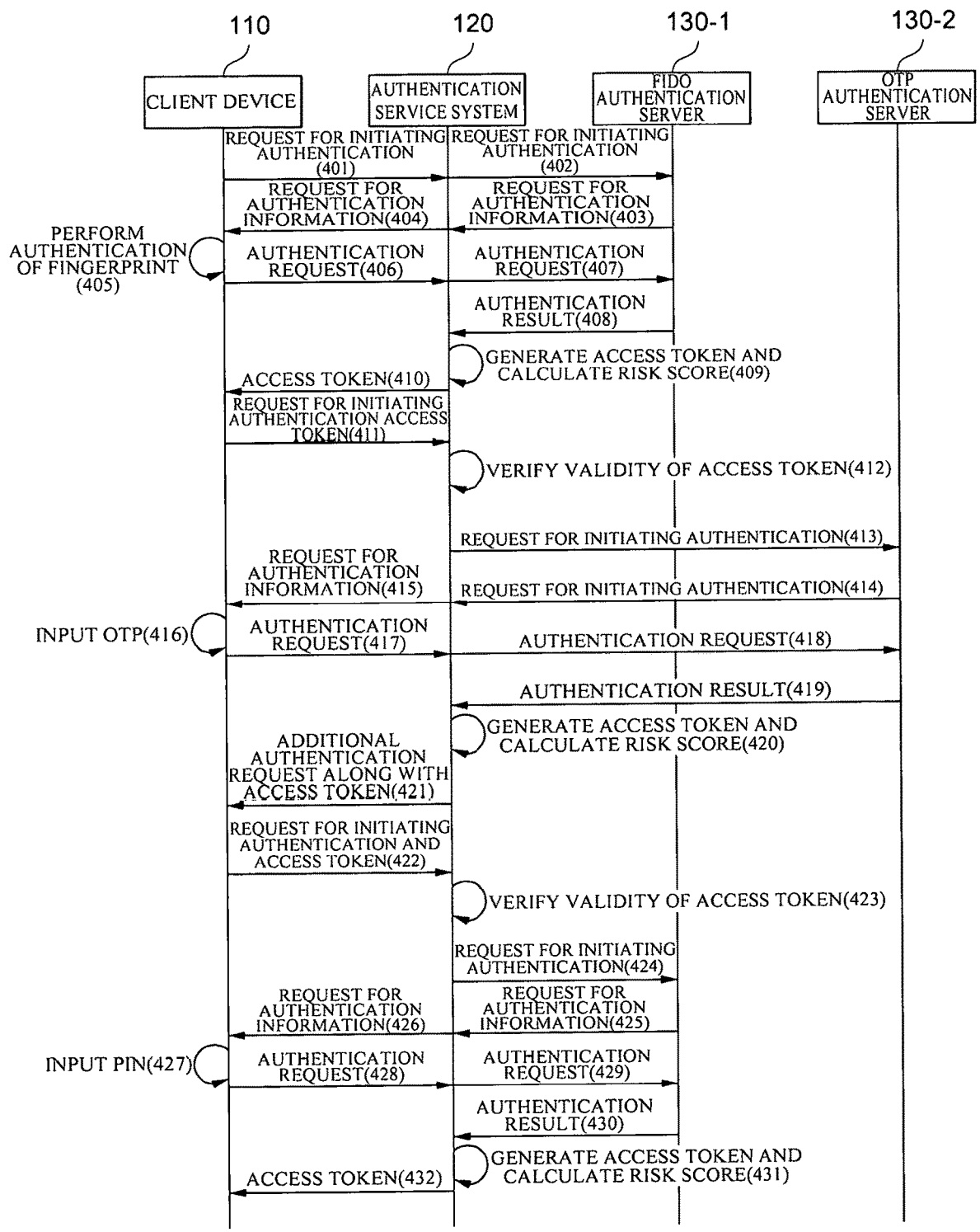
FIG. 4 is a flowchart illustrating another example of a user authentication process performed by an authentication system according to one embodiment of the present disclosure.

FIG. 4 is a flowchart illustrating another example of a user authentication process performed by an authentication system according to an embodiment of the present disclosure.

Specifically, the example shown in FIG. 4 assumes that an authentication process using a user's fingerprint and an authentication process according a challenge-response OTP authentication scheme are sequentially performed and then an additional authentication process using a PIN is performed.

Referring to FIG. 4, the client device 110 transmits, to the authentication service system 120, a request for initiating authentication, which includes authentication factor identification information indicating that an authentication factor selected by a user is a user's fingerprint in operation 401.

Then, the authentication service system 120 forwards the request for initiating authentication to the FIDO authentication server 130-1 based on the authentication factor identification information included in the received request for initiating authentication in operation 402.

Subsequently, in response to the request for initiating authentication, the FIDO authentication server 130-1 transmits a request for authentication information to the authentication service system in operation 403. In this case, the request for authentication information may include, for example, policy information of the FIDO authentication server 130-1 and a challenge value.

Next, the authentication service system 120 forwards the received request for authentication information to the client device 110 in operation 404.

Then, the client device 110 authenticates the user's fingerprint and generates a signature value for the challenge value using a user's private key when the authentication of the fingerprint is successful in operation 405.

Subsequently, the client device 110 transmits, to the authentication service system 120, an authentication request which includes the generated signature value as authentication information in operation 406.

Next, the authentication service system 120 forwards the received authentication request to the FIDO authentication server 130-1 in operation 407.

Then, the FIDO authentication server 130-1 authenticates the user by verifying the signature value using a pre-registered public key of the user and transmits an authentication result to the authentication service system 120 in operation 408.

Subsequently, when the authentication is successful, the authentication service system 120 generates an access token in operation 409, and transmits the generated access token to the client device 110 in operation 410. In this case, the access token may include authentication factor identification information indicating that a fingerprint is used as the authentication information.

Subsequently, the client device 110 transmits, to the authentication service system 120, a request for initiating authentication in operation 411, which includes authentication factor identification information indicating that an authentication factor selected by the user is an OTP, along with the access token received in operation 410.

Then, the authentication service system 120 verifies validity of the received access token; and if the received access token is valid, the authentication service system 120 forwards the request for initiating authentication based on the authentication factor identification information, included in the request for initiating authentication, to the OTP authentication server 130-2 in operation 413.

Subsequently, in response to the request for initiating authentication, the OTP authentication server 130-2 transmits a request for authentication information to the authentication service system 120 in operation 414. In this case, the request for authentication information may include, for example, any random value.

Next, the authentication service system 120 forwards the received request for authentication information to the client device 110 in operation 415.

Then, the client device 110 provides the received random number to the user and receives an OTP input from the user in operation 416. In this case, the OTP may be, for example, a value obtained by inputting the random number to an OTP generator possessed by the user.

Subsequently, the client device 110 encrypts the input OTP, and transmits an authentication request, including the encrypted value as authentication information, to the authentication service system 120 in operation 417.

Then, the authentication service system 120 forwards the received authentication request to the OTP authentication server 130-2 in operation 418.

Then, the OTP authentication server 130-2 authenticates the user using the received authentication information and transmits an authentication result to the authentication service system 120 in operation 419.

Subsequently, when the authentication is successful, the authentication service system 120 generates an access token and calculates a risk score in operation 420. In this case, the access token may include authentication factor identification information which indicates that a fingerprint and an OTP are used as authentication information.

Meanwhile, in response to the calculated risk score exceeding a threshold, the authentication service system 120 transmits an additional authentication request to the client device 110 along with the generated access token in operation 421.

Then, the client device 110 transmits, to the authentication service system 120, a request for initiating authentication in operation 422, which includes authentication factor identification information indicating that an additional authentication factor selected by the user is a PIN, along with the access token received in operation 421.

Subsequently, the authentication service system 120 verifies validity of the received access token in 423; and if the received access token is valid, the authentication service system 120 transmits a request for initiating authentication based on the authentication factor identification information, included in the received request for a g authentication, to the FIDO authentication server 130-1 in operation 424.

Next, in response to the request for initiating authentication, the FIDO authentication server 130-1 transmits a request for authentication information to the authentication service system 120 in operation 425. In this case, the request for authentication information may include, for example, policy information of the FIDO authentication server 130-1 and a challenge value.

Then, the authentication service system 120 forwards the received request for authentication information to the client device 110 in operation 426.

Subsequently, the client device 110 authenticates the user by receiving a PIN value input from the user, and generates a signature value for the challenge value using a user's private key when the user authentication is successful, in operation 427.

Next, the client device 110 transmits an authentication request, including the generated signature value as authentication information, to the authentication service system 120 in operation 428.

Then, the authentication service system 120 transmits the received authentication request to the FIDO authentication server 130-1 in operation 429.

Subsequently, the FIDO authentication server 130-1 authenticates the user by verifying the signature value using a pre-registered public key of the user and transmits an authentication result to the authentication service system 120 in operation 430.

Next, when the authentication is successful, the authentication service system 120 generates an access token, and calculates a risk score in operation 431. In this case, the access token may include authentication factor identification information indicating that a fingerprint, an OTP, and a PIN are used as the authentication information.

Then the authentication service system 120 transmits the generated access token to the client device 110 in operation 432.

While FIG. 3 illustrates an example of using a fingerprint and an OTP as authentication factors in each authentication process for user authentication, and FIG. 4 illustrates an example of using a fingerprint, an OTP, and a PIN as authentication factors in each authentication process for user authentication, authentication factors and methods used in each authentication process are not necessarily limited to the examples illustrated in FIGS. 3 and 4. That is, in the embodiments of the present disclosure, examples of authentication factors, which may be used in each authentication process for user authentication, may include various authentication factors such as iris, voice, ID/password, and the like, in addition to the authentication factors such as fingerprint, OTP, and PIN illustrated in FIGS. 3 and 4; and authentication schemes performed in each authentication process may vary depending on authentication factors.

Figure 5:
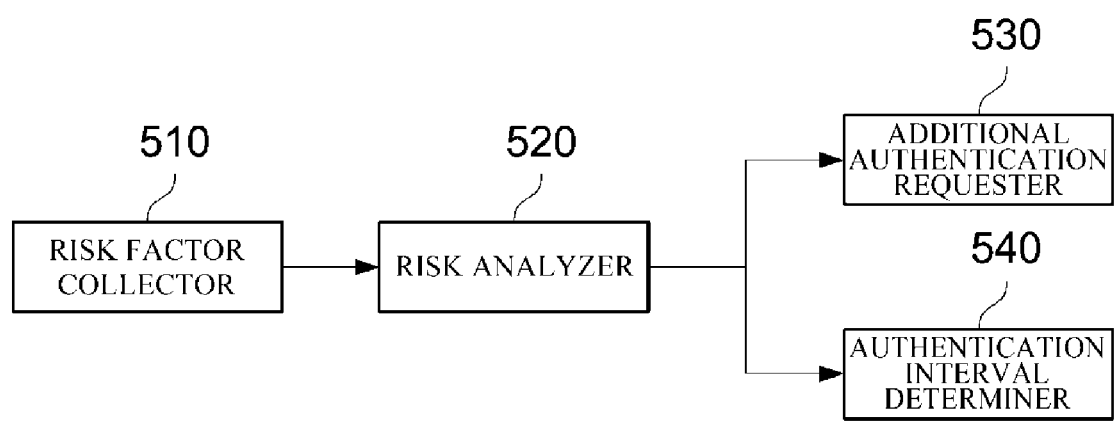
FIG. 5 is a diagram illustrating a configuration of a risk analysis apparatus according to one embodiment of the present disclosure.

FIG. 5 is a diagram illustrating a configuration of a risk analysis apparatus according to an embodiment of the present disclosure.

The risk analysis apparatus 500 shown in FIG. 5 may be implemented as one component included in, for example, the authentication service system 120 shown in FIG. 1.

Referring to FIG. 5, the risk analysis apparatus 500 according to one embodiment of the present disclosure includes a risk factor collector 510, a risk analyzer 520, an additional authentication requester 530, and an authentication interval determiner 540.

The risk factor collector 510 collects risk factors related to one or more authentication processes performed at the authentication system 100 for user authentication. In this case, the risk factors may be collected by, for example, the client device 100 in each authentication process and then transmitted to the authentication service system 120, or may be collected from the authentication servers 130.

Meanwhile, the risk factors may be obtained during user authentication, and may include various items of data which may be used to analyze an authentication pattern of a user. For example, the risk factors may include pieces of data related to the user's authentication activity, such as authentication time, the number of authentications, authentication means, required time for authentication, authentication location, authentication result, authentication frequency and interval, and the like.

In another example, the risk factors may include pieces of data related to the client device 110 which are used for user authentication, such as identification information, location information, vaccine information, system resource, network status, and the like of the client device 110.

In yet another example, the risk factors may include pieces of data associated with authentication factors, such as authentication factors used in an authentication process for user authentication, biometric scores, and the like.

The risk analyzer 520 calculates a current risk score and a total risk score for the user.

Specifically, the risk analyzer 520 calculates the current risk score for the user using the risk factors collected by the risk factor collector 510.

In this case, according to one embodiment of the present disclosure, the risk analyzer 520 may calculate the current risk score by comparing the currently collected risk factors with a user's authentication pattern learned through machine learning using risk factors (hereinafter, referred to as "past risk factors") collected in each of the authentication processes previously performed for the user.

For example, the risk analyzer 520 may compare the currently collected risk factors with the authentication pattern learned using the past risk factors of the user; and as similarity between the authentication pattern and the currently collected risk factors is low, the risk analyzer 520 may increase the current risk score.

More specifically, the risk analyzer 520 may increase the current risk score as a difference between a main authentication time of the user which is learned using the past risk factors and an authentication time collected as the current risk factor is greater.

In another example, the risk analyzer 520 may increase the current risk score as a difference in distance between the main authentication location of the user which is learned using the past risk factors and an authentication location collected as the current risk factor is greater.

According to another embodiment of the present disclosure, the risk analyzer 520 may calculate the current risk score by comparing rules, generated by learning using risk factors associated with authentication processes previously performed for a plurality of users, with the current risk factors.

For example, the risk analyzer 520 may increase the current risk score when the identification information of the client device 100 collected as the current risk factor is the same as identification information of a device registered in a blacklist.

In another example, the risk analyzer 520 may compare, based on the generated rules, an authentication location and an authentication time, which are collected as the current risk factors, with an authentication location and an authentication time which are collected during a immediately preceding user authentication process as risk factors; and in the case where an authentication location between the two authentication times is changed significantly (e.g., in the case of performing authentication in Busan 10 minutes after authentication in Seoul), the risk analyzer 520 may increase the current risk score.

Meanwhile, the risk analyzer 520 calculates a total risk score based on a risk score history including the current risk score and risk scores previously calculated for the user.

Figure 6A:
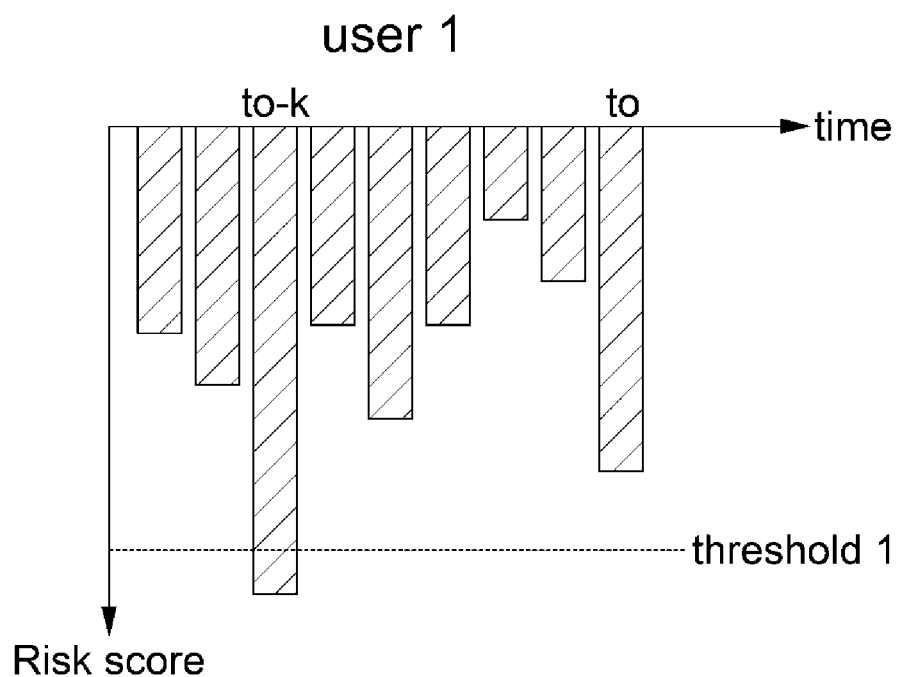

FIGS. 6A to 6C are diagrams illustrating examples of a risk score history.

In FIGS. 6A to 6C, current risk scores of three users, user 1, user 2, and user 3, calculated at a current time t0 are the same, but risk scores previously calculated for each of the users have different patterns.

Referring to FIG. 6A, in the case of user 1, it can be seen that a fluctuation among the past risk scores is large and the current risk score has rapidly increased compared to the immediately preceding risk score.

Referring to FIG. 6B, in the case of user 2, it can be seen that previously calculated risk scores remain relatively low without significant fluctuation, but the current risk score has rapidly increased compared to the immediately preceding risk score.

Referring to FIG. 6C, in the case of user 3, it can be seen that the current risk score has a lower value than the immediately preceding risk score, but still the recently calculated risk scores are consistently high.

Accordingly, as illustrated in FIGS. 6A to 6C, even if the current risk scores of the users are the same, each of the users nay have a different risk score history, and a total risk score calculated for each of the users may also be different.

For example, the risk analyzer 520 may calculate the total risk score using the sum of weights of the current risk score and the past risk scores calculated for a specific recent period, which are included in the user's risk score history. In this case, the risk analyzer 520 may apply a higher weighted value to a more recently calculated risk score, so that the total risk score has a higher value as a value of the recently calculated risk score is higher.

In another example, the risk analyzer 520 may calculate the total risk score by comparing a change pattern of past risk scores, which are calculated recently for a predetermined period of time, with the current risk score. More specifically, in the case where the past risk scores, calculated recently for a predetermined period of time, are maintained at a certain level without a significant fluctuations, the risk analyzer 520 may calculate a high total risk score even when a difference between the mean of the past risk scores and the current risk score is small. By contrast, in the case where the past risk scores, calculated recently for a predetermined period of time, are changed irregularly, the risk analyzer 520 may calculate a high total risk score only when the difference between the mean of the past risk scores and the current risk score is large.

Specifically, the risk analyzer 520 may calculate the total risk score by using, for example, the following Equation 1.

$$S_t = \alpha(S_c - S_{mean}) \qquad \text{[Equation 1]}$$

In Equation 1, $S_t$ denotes a total risk score, $S_c$ denotes a current risk score, $S_{mean}$ denotes the mean of past risk scores calculated recently for a predetermined period of time, and α denotes a weighted value. In the case where the previous risk scores, calculated recently for a predetermined period of time, are maintained at a constant level without a significant fluctuations, the risk analyzer 520 may set the weighted value α to be a high value; and in the case where the past risk scores, calculated recently for a predetermined period of time, are changed irregularly, the risk analyzer 520 may set the weighted value α to be a low value.

In another example, the risk analyzer 520 may calculate a higher total risk score as the number of past risk score, calculated recently for a predetermined period of time, exceeding a threshold value is higher.

Meanwhile, in addition to the above-described examples, the total risk score may be calculated by using various methods which may evaluate a risk of an individual user based on a current risk score and a risk score history.

The additional authentication requester 530 determines whether to perform an additional authentication process for a user based on the current risk score and the total risk score calculated by the risk analyzer 520.

Specifically, the additional authentication requester 530 may request the client device 110 for additional authentication of the user when the current risk score exceeds a first threshold value or when the total risk score exceeds a second threshold value while the current risk score does not exceed the first threshold.

Figure 7:
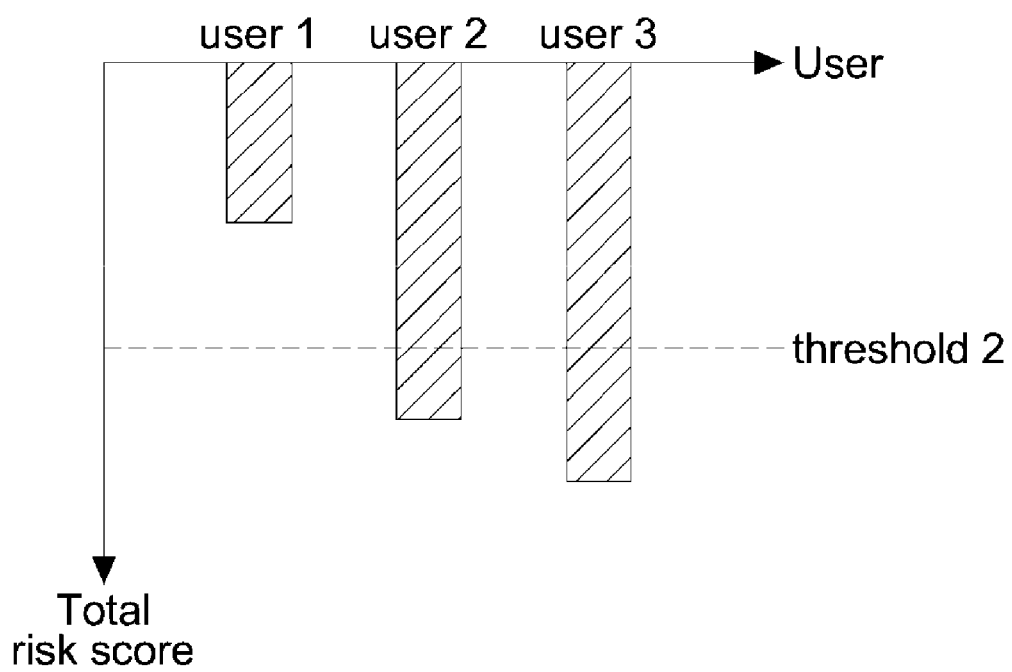
FIG. 7 is a diagram illustrating an example of a total risk score.

Specifically, FIG. 7 is a diagram illustrating an example of the total risk score.

Referring to FIGS. 6A, 6B, 6C and 7, in the example shown in FIGS. 6A to 6C, the current risk scores of each user do not exceed the first threshold value, threshold 1, but in the example shown in FIG. 7, the total risk scores of user 2 and user 3 exceed the second threshold value, threshold 2, and thus the additional authentication requester 530 may request client devices of user 2 and user 3 for additional authentication.

The authentication interval determiner 540 determines a re-authentication time for continuous authentication when an application service provided by the service provider 200 requires continuous authentication.

Specifically, according to an embodiment of the present disclosure, the authentication interval determiner 540 may calculate a confidence value for the user based on the total risk score calculated by the risk analyzer 520 or a past authentication history of the user and determine the re-authentication time for continuous authentication according to the calculated confidence value.

More specifically, the authentication interval determiner 540 may assign a higher confidence value as the total risk score for the user is lower and increase or decrease the re-authentication time for the user according to the confidence value.

For example, when the total risk score is calculated as a value between 1 and 0, the confidence value may be calculated as a value between 1 and 5 according to the range of the total risk score as shown in Table 1 below.

TABLE 1

| Confidence value | Range of total risk score ($S_t$) | Re-authentication time |
| --- | --- | --- |
| 1 | 1 ≥ $S_t$ > 0.8 | $t_0$ + 5α |
| 2 | 0.8 ≥ $S_t$ > 0.6 | $t_0$ + 4α |
| 3 | 0.6 ≥ $S_t$ > 0.4 | $t_0$ + 3α |
| 4 | 0.4 ≥ $S_t$ > 0.2 | $t_0$ + 2α |
| 5 | 0.2 ≥ $S_t$ > 0 | $t_0$ + α |

Meanwhile, $t_0$ denotes a current authentication success time and α denotes a preset authentication interval. That is, in the α is set to 5 minutes, a user of a confidence value of 5 is required to perform re-authentication before a lapse of 5 minutes after the current authentication success time $t_0$; and a user of a confidence value of 4 is required to perform re-authentication before a lapse of 10 minutes after the current authentication success time $t_0$.

In another example, the authentication interval determiner 540 may calculate an authentication failure probability based on the user's previous authentication history and determine the re-authentication time according to the calculated authentication failure probability. In this case, the authentication failure probability may be calculated, for example, using an analysis of the user's past authentication success/failure pattern.

Specifically, the authentication interval determiner 540 may apply a higher confidence value as the authentication failure probability is lower, and may increase or decrease the re-authentication time according to the confidence value.

For example, when the authentication failure probability is calculated as a value between 1 and 0, the confidence value may be calculated as a value between 1 and 5 according to the authentication failure probability as shown in Table 2 below.

TABLE 2

| Confidence value | Range of authentication failure probability (p) | Re-authentication time |
| --- | --- | --- |
| 1 | 1 ≥ p > 0.8 | $t_0$ + 5α |
| 2 | 0.8 ≥ p > 0.6 | $t_0$ + 4α |
| 3 | 0.6 ≥ p > 0.4 | $t_0$ + 3α |
| 4 | 0.4 ≥ p > 0.2 | $t_0$ + 2α |
| 5 | 0.2 ≥ p > 0 | $t_0$ + α |

The above-described range of confidence value and the calculation methods are exemplary, and the range of confidence value and the calculation methods may be variously modified according to embodiments.

In one embodiment, the risk factor collector 510, the risk analyzer 520, the additional authentication requester 530, and the authentication interval determiner 540 shown in FIG. 5 may be implemented on one or more computing devices including one or more processors and a computer readable recording medium connected to the processors. The computer readable recording medium may be present inside or outside of the processor or be connected to the processors by well-known various means. The processors in the computing device may cause each computing device to operate according to the foregoing illustrative embodiments. For example, the processors may execute commands stored in the computer readable recording medium and the commands stored in the computer readable recording medium may be configured to, when executed by the processor, cause the computing device to perform operations according to the illustrative embodiment.

Figure 8:
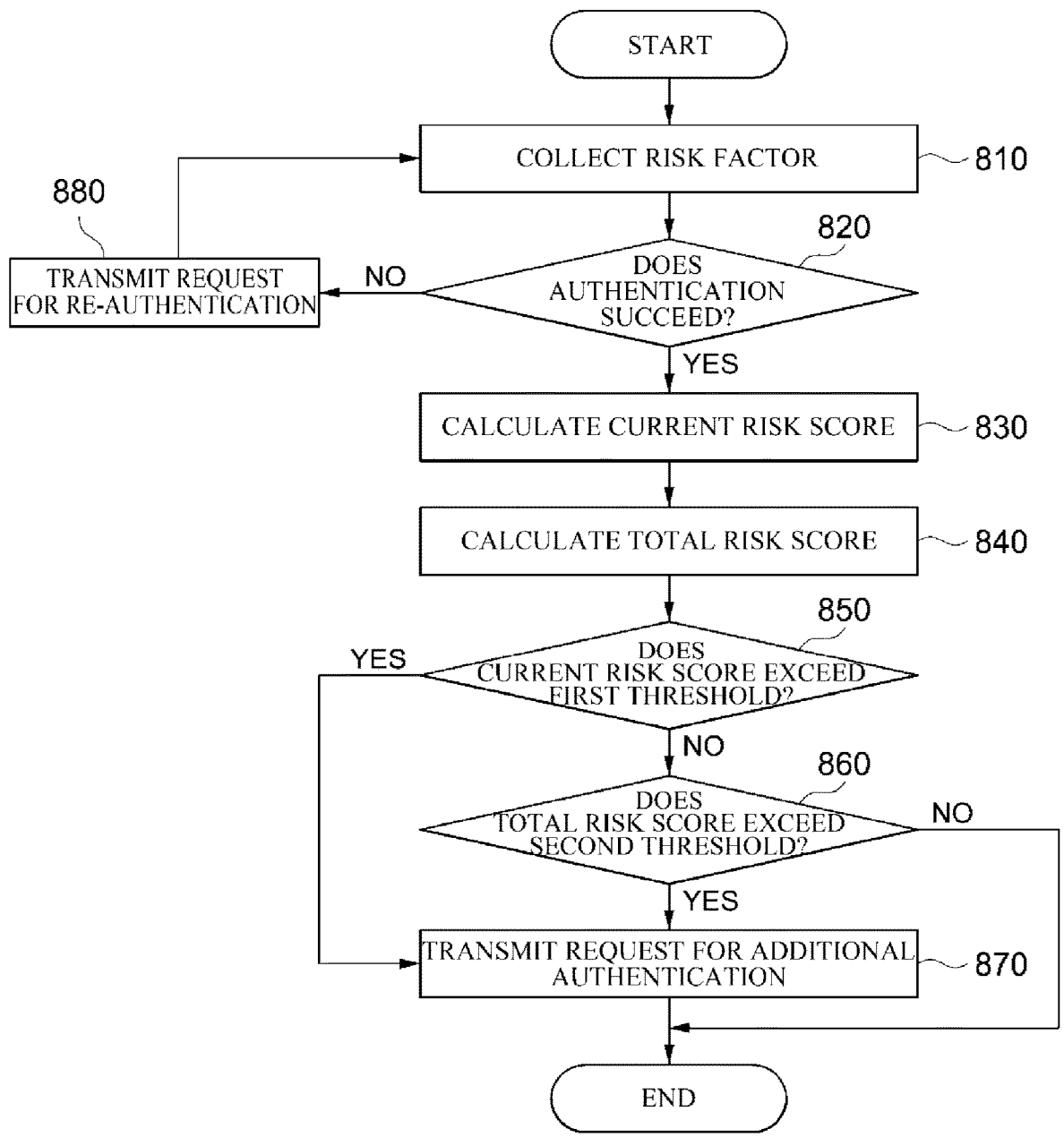
FIG. 8 is a flowchart illustrating a risk analysis method according to one embodiment of the present disclosure.

FIG. 8 is a flowchart illustrating a risk analysis method according to an embodiment of the present disclosure.

The method illustrated in FIG. 8 may be performed by, for example, the risk analysis apparatus 500 illustrated in FIG. 5.

Referring to FIG. 8, the risk analysis apparatus 500, first, collects risk factors related to one or more authentication processes performed for authenticating a user of the client device 110 in operation 810.

Then, when the user authentication through the one or more authentication processes is successful in operation 820, the risk analysis apparatus 500 calculates a current risk score for the user using the collected risk factors in operation 830.

Then, the risk analysis apparatus 500 calculates a total risk score for the user based on a risk score history including the current risk score and previously calculated risk scores in operation 840.

Then, the risk analysis apparatus 500 determines whether the current risk score exceeds a first threshold in operation 850.

In this case, when the current risk score exceeds the first threshold, the risk analysis apparatus 500 requests the client device 110 for additional authentication of the user in operation 870.

On the contrary, when the current risk score does not exceed the first threshold, the risk analysis apparatus 500 determines whether the total risk score exceeds a second threshold in operation 860.

In this case, when the total risk score exceeds the second threshold, the risk analysis apparatus 500 requests the client device 110 for additional authentication in operation 870.

Meanwhile, when the user authentication is failed in operation 820, the risk analysis apparatus 500 requests the client device 110 for re-authentication in operation 880.

Figure 9:
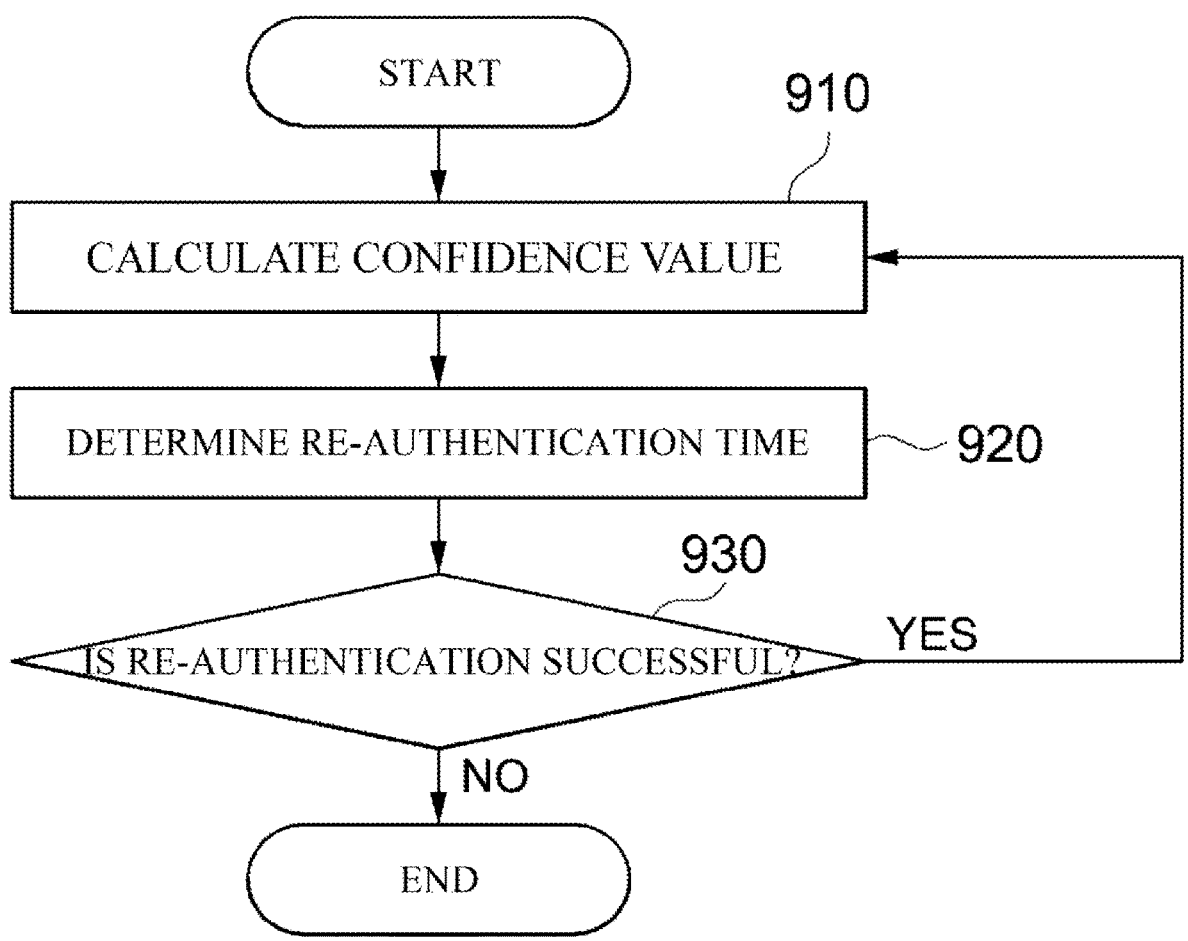
FIG. 9 is a flowchart illustrating a process of determining a re-authentication time for continuous authentication according to one embodiment of the present disclosure.

FIG. 9 is a flowchart illustrating a process of determining a re-authentication time for continuous authentication according to an embodiment of the present disclosure.

The method illustrated in FIG. 9 may be performed by, for example, the risk analysis apparatus 500 illustrated in FIG. 5.

Referring to FIG. 9, when user authentication is successful, the risk analysis apparatus 500 calculates a confidence value based on a total risk score or a user's authentication history in operation 910.

Thereafter, the risk analysis apparatus 500 determines a re-authentication time for continuous authentication based on the calculated confidence value in operation 920.

Then, when the user succeeds in re-authentication within the determined re-authentication time in operation 930, the risk analysis apparatus 500 repeatedly performs operations 910 to 930 until re-authentication is failed.

In the flowcharts illustrated in FIGS. 8 and 9, the method is illustrated as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 10:
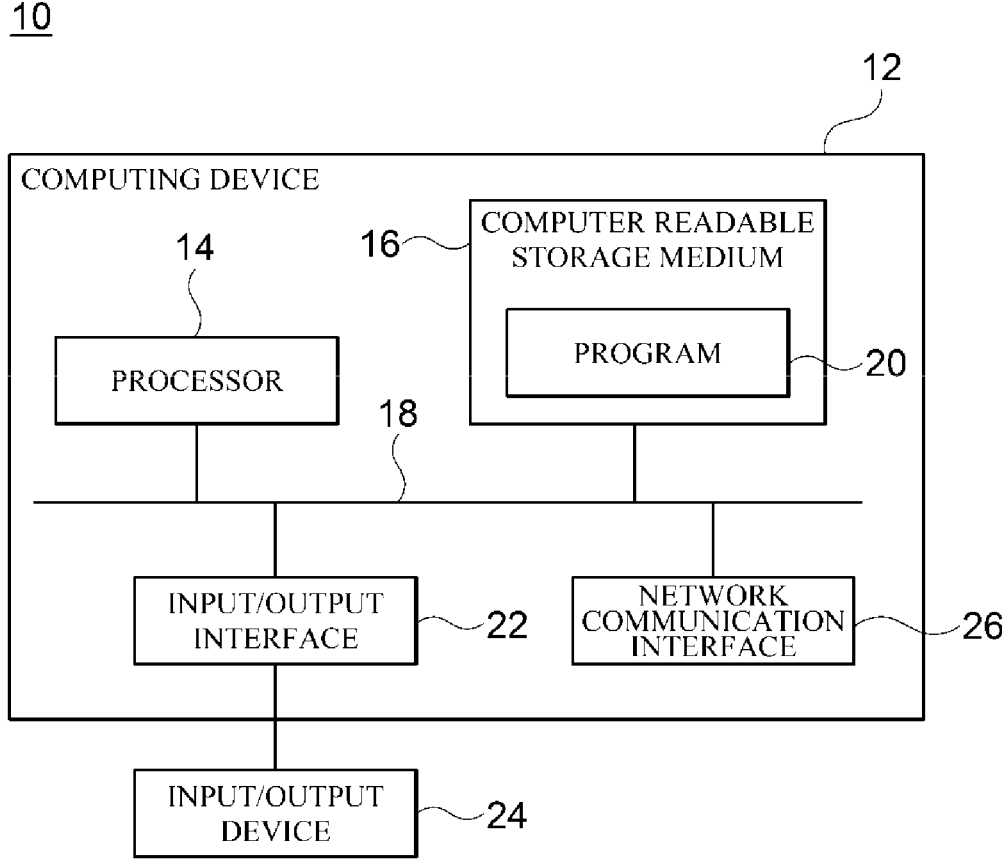
FIG. 10 is a block diagram for describing a computing environment including a computing device suitable to be used in exemplary embodiments.

FIG. 10 is a block diagram for describing a computing environment including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an authentication service system 120 or one or more components included in the authentication service system 120.

The computing device 12 includes at least one processor 12, a computer readable storage medium 16, and a communication bus 18. The processor 14 may cause the computing device 12 to operate according to the foregoing illustrative embodiments. For example, the processor 14 may execute one or more programs stored in the computer readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to embodiments of the present disclosure, authentication processes using different authentication factors and methods are combined and relayed through one system, thereby improving flexibility of a system for multi-factor authentication.

Further, according to embodiments of the present disclosure, when a plurality of authentication processes are performed using different authentication factors, an access token is issued based on an authentication factor used in a previous authentication process; and a subsequent authentication process is performed according to validity of the access token issued in the previous authentication process. In this manner, a replay attack by a third party may be prevented, and authentication may be strengthened by risk analysis, thereby improving safety and security of authentication processes.

In addition, according to embodiments of the present disclosure, a risk score is calculated by considering a user's risk history, and risk analysis may be performed by considering characteristics and an authentication environment of an individual user.

Moreover, according to embodiments of the present disclosure, when continuous authentication is required in order to use a service, an authentication interval may be adjusted flexibly by considering a user's risk history, thereby improving user convenience.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication service method, comprising:
    relaying a first authentication process for a user of a client device by receiving, from the client device, identification information for a first authentication factor and first authentication information generated based on the first authentication factor, and transmitting, to one of a plurality of authentication servers, the first authentication information based on the identification information for the first authentication factor;
    generating a first access token, which includes the identification information for the first authentication factor based on the first authentication process being successful, and transmitting the generated first access token to the client device;
    receiving the first access token from the client device and verifying validity of the received first access token;
    relaying, based on the received first access token being valid, a second authentication process for the user of the client device by receiving, from the client device, identification information for a second authentication factor and second authentication information generated based on the second authentication factor, and transmitting, to one of the plurality of authentication servers, the second authentication information based on the identification information for the second authentication factor; and
    generating a second access token, which includes the identification information for each of the first authentication factor and the second authentication factor, and transmitting the generated second access token to the client device based on the second authentication process being successful.

2. The method of claim 1, wherein each of the first authentication factor and the second authentication factor is one from among a knowledge-based authentication factor, a possession-based authentication factor, and a feature-based authentication factor.

3. The method of claim 1, wherein the plurality of authentication servers comprises at least one from among a Fast Identity Online (FIDO)-based authentication server, an OTP-based authentication server, a Short Message Service (SMS)-based authentication server, an e-mail based authentication server, a certificate-based authentication server, and an ID/password-based authentication server.

4. The method of claim 1, further comprising:
    calculating a risk score for the first authentication process based on risk factors associated with the first authentication process and the first authentication process being successful; and
    determining whether the second authentication process is required based on the calculated risk score,
    wherein the transmitting the generated first access token to the client device comprises transmitting a request for performing the second authentication process to the client device based on the second authentication process being required; and
    wherein the receiving the first access token, the relaying the second authentication process and generating the second access token are performed based on the request for performing the second authentication process being transmitted.

5. The method of claim 1, further comprising calculating, based on successful completion of the second authentication process, a risk score based on risk factors associated with the first authentication process and the second authentication process.

6. The method of claim 5, further comprising determining whether a third authentication process is required based on the calculated risk score,
    wherein the transmitting the generated second access token and a request for performing the third authentication process to the client device are performed based on the third authentication process being required.

7. The method of claim 6, further comprising:
    receiving the second access token from the client device, and verifying validity of the second access token;
    relaying, based on the received second access token being valid, the third authentication process for the user of the client device by receiving, from the client device, identification information for a third authentication factor and third authentication information generated based on the third authentication factor, and transmitting, to one of the plurality of authentication servers, the third authentication information based on the identification information for the third authentication factor; and
    generating a third access token, which includes the identification information for each of the first authentication factor, the second authentication factor, and the third authentication factor, and transmitting the generated third access token to the client device based on the third authentication process being successful.

8. The method of claim 7, wherein each of the first authentication factor, the second authentication factor, and the third authentication factor is one from among a knowledge-based authentication factor, a possession-based authentication factor, and a feature-based authentication factor.

9. The method of claim 7, further comprising calculating the risk score based on risk factors associated with the first authentication process, the second authentication process, and the third authentication process based on the third authentication process being successful.

10. An authentication service system, comprising:
    one or more processors;
    a memory; and
    one or more programs configured to be executed by the one or more processors and stored in the memory, wherein the one or more programs comprise instructions to control the authentication service system to perform:
relaying a first authentication process for a user of a client device by receiving, from the client device, identification information for a first authentication factor and first authentication information generated based on the first authentication factor, and transmitting, to one of a plurality of authentication servers, the first authentication information based on the identification information for the first authentication factor;
generating a first access token, which includes the identification information for the first authentication factor based on the first authentication process being successful, and transmitting the generated first access token to the client device;
receiving the first access token from the client device and verifying validity of the received first access token;
relaying, based on the received first access token being valid, a second authentication process for the user of the client device by receiving, from the client device, identification information for a second authentication factor and second authentication information generated based on the second authentication factor, and transmitting, to one of the plurality of authentication servers, the second authentication information based on the identification information for the second authentication factor; and
generating a second access token, which includes the identification information for each of the first authentication factor and the second authentication factor, and transmitting the generated second access token to the client device based on the second authentication process being successful.

11. The authentication service system of claim 10, wherein each of the first authentication factor and the second authentication factor is one from among a knowledge-based authentication factor, a possession-based authentication factor, and a feature-based authentication factor.

12. The authentication service system of claim 10, wherein the plurality of authentication servers comprise at least one from among a Fast Identity Online (FIDO)-based authentication server, an OTP-based authentication server, a Short Message Service (SMS)-based authentication server, an e-mail based authentication server, a certificate-based authentication server, and an ID/password-based authentication server.

13. The authentication service system of claim 10, wherein the one or more programs further comprise instructions to control the authentication service system to perform:
calculating a risk score for the first authentication process based on risk factors associated with the first authentication process and the first authentication process being successful; and
determining whether the second authentication process is required based on the calculated risk score,
wherein the transmitting the generated first access token to the client device comprises transmitting a request for performing the second authentication process to the client device based on the second authentication process being required; and
wherein the receiving the first access token, the relaying the second authentication process and generating the second access token are performed based on the request for performing the second authentication process being transmitted.

14. The authentication service system of claim 10, wherein the one or more programs further comprise instructions to control the authentication service system to perform calculating, based on successful completion of the second authentication process, a risk score based on risk factors associated with the first authentication process and the second authentication process.

15. The authentication service system of claim 14, wherein the one or more programs further comprise instructions to control the authentication service system to perform determining whether a third authentication process is required based on the calculated risk score,
wherein the transmitting the generated second access token and a request for performing the third authentication process to the client device are performed based on the third authentication process being required.

16. The authentication service system of claim 15, wherein the one or more programs further comprise instructions to control the authentication service system to perform:
receiving the second access token from the client device, and verifying validity of the second access token;
relaying, based on the received second access token being valid, the third authentication process for the user of the client device by receiving, from the client device, identification information for a third authentication factor and third authentication information generated based on the third authentication factor, and transmitting, to one of the plurality of authentication servers, the third authentication information based on the identification information for the third authentication factor; and
generating a third access token, which includes the identification information for each of the first authentication factor, the second authentication factor, and the third authentication factor, and transmitting the generated third access token to the client device based on the third authentication process being successful.

17. The authentication service system of claim 16, wherein each of the first authentication factor, the second authentication factor, and the third authentication factor is one from among a knowledge-based authentication factor, a possession-based authentication factor, and a feature-based authentication factor.

18. The authentication service system of claim 16, wherein the one or more programs further comprise instructions to control the authentication service system to perform, calculating the risk score based on risk factors associated with the first authentication process, the second authentication process, and the third authentication process based on the third authentication process being successful.

19. A non-transitory computer readable recording medium having embodied thereon a program, which when executed by a processor of an authentication service system, causes the authentication service system to execute a method, the method including:
relaying a first authentication process for a user of a client device by receiving, from the client device, identification information for a first authentication factor and first authentication information generated based on the first authentication factor, and transmitting, to one of a plurality of authentication servers, the first authentication information based on the identification information for the first authentication factor;
generating a first access token, which includes the identification information for the first authentication factor based on the first authentication process being successful, and transmitting the generated first access token to the client device;

receiving the first access token from the client device and verifying validity of the received first access token;

relaying, based on the received first access token being valid, a second authentication process for the user of the client device by receiving, from the client device, identification information for a second authentication factor and second authentication information generated based on the second authentication factor, and transmitting, to one of the plurality of authentication servers, the second authentication information based on the identification information for the second authentication factor; and generating a second access token, which includes the identification information for each of the first authentication factor and the second authentication factor, and transmitting the generated second access token to the client device based on the second authentication process being successful.

* * * * *